United States Patent
Lee et al.

(10) Patent No.: US 8,838,161 B2
(45) Date of Patent: Sep. 16, 2014

(54) UPLINK POWER CONTROL METHOD FOR MOBILE COMMUNICATION SYSTEM

(75) Inventors: Hyo Jin Lee, Gyeonggi-do (KR); Joon Young Cho, Gyeonggi-do (KR); Jin Kyu Han, Seoul (KR); Myung Hoon Yeon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/162,195

(22) Filed: Jun. 16, 2011

(65) Prior Publication Data

US 2011/0310987 A1 Dec. 22, 2011

(30) Foreign Application Priority Data

| Jun. 16, 2010 | (KR) | 10-2010-0056951 |
| Jun. 30, 2010 | (KR) | 10-2010-0062861 |
| Nov. 3, 2010 | (KR) | 10-2010-0108878 |
| Nov. 5, 2010 | (KR) | 10-2010-0109741 |
| Nov. 8, 2010 | (KR) | 10-2010-0110579 |

(51) Int. Cl.
*H04B 7/00* (2006.01)
*H04W 52/14* (2009.01)
*H04W 52/04* (2009.01)
*H04W 52/08* (2009.01)
*H04W 52/10* (2009.01)
*H04W 52/24* (2009.01)

(52) U.S. Cl.
CPC ............ *H04W 52/146* (2013.01); *H04W 52/04* (2013.01); *H04W 52/08* (2013.01); *H04W 52/10* (2013.01); *H04W 52/248* (2013.01)
USPC ............................... 455/522; 455/68; 455/69

(58) Field of Classification Search
CPC ... H04W 52/146; H04W 52/04; H04W 52/08; H04W 52/10; H04W 52/248
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| 5,898,740 | A | * | 4/1999 | Laakso et al. | 375/346 |
| 7,856,243 | B2 | * | 12/2010 | Gunnarsson et al. | 455/522 |
| 2002/0115464 | A1 | * | 8/2002 | Hwang et al. | 455/522 |
| 2008/0069062 | A1 | * | 3/2008 | Li et al. | 370/338 |
| 2011/0081935 | A1 | * | 4/2011 | Yeon et al. | 455/522 |
| 2011/0105174 | A1 | * | 5/2011 | Pelletier et al. | 455/522 |
| 2011/0243278 | A1 | * | 10/2011 | Cheng | 375/340 |

* cited by examiner

*Primary Examiner* — Dominic E Rego
(74) *Attorney, Agent, or Firm* — The Farrell Law Firm, P.C.

(57) ABSTRACT

A per-layer and per-antenna uplink power control method for MIMO transmission of PUSCH in a Long Term Evolution-Advanced (LTE-A) system is provided. A transmit power for a plurality of transmit antennas is calculated based on a power control parameter received in a downlink. Uplink data is transmitted through the plurality of transmit antennas by applying the transmit power to each of a plurality of codewords.

16 Claims, 10 Drawing Sheets

UPLINK POWER CONTROL METHOD FOR MOBILE COMMUNICATION SYSTEM

PRIORITY

This application claims priority under 35 U.S.C. 119(a) to applications filed in the Korean Intellectual Property Office on Jun. 16, 2010, Jun. 30, 2010, Nov. 3, 2010, Nov. 5, 2010 and Nov. 8, 2010, and assigned Serial Nos. 10-2010-0056951, 10-2010-0062861, 10-2010-0108878, 10-2010-0109741 and 10-2010-0110579, respectively, the contents of which are incorporated herein by reference.

BACKGROUND OF THE INVENTION

1. Field of the Invention

The present invention relates generally to an uplink power control method for a mobile communication system and, more particularly, to a per-layer and per-antenna uplink power control method for Multiple-Input Multiple-Output (MIMO) transmission in a Long Term Evolution-Advanced (LTE-A) system.

2. Description of the Related Art

Recently, a great deal of research has been conducted relating to the use of Orthogonal Frequency Division Multiple Access (OFDMA) and Single Carrier Frequency Division Multiple Access (SC-FDMA) as schemes for high-speed data transmission over a radio channel. In LTE, a next generation mobile communication system, OFDM is adopted in downlink transmission while SC-FDMA is adopted in uplink transmission.

Since it is well known that OFDMA has a high Peak-to-Average Power Ratio (PAPR), a large back-off is required for the input to the power amplifier to avoid nonlinear signal distortion, which lowers the maximum transmit power, resulting in low power efficiency. The back-off sets the maximum transmit power to a level lower than the maximum power of the power amplifier to ensure the linearity of the transmit signal. For example, when the maximum power of the power amplifier is 23 dBm and the back-off is 3 dBm, the maximum transmit power is restricted to 20 dBm.

OFDMA has no significant drawbacks as a downlink multiplexing technology because the transmitter is located in a base station that has no power shortage problem. However, OFDMA has significant drawbacks as an uplink multiplexing technology, because the transmitter of the user equipment has severe power limitations. The transmit power constraint of the user equipment may cause a reduction of service coverage of the base station. In order to overcome this problem, the LTE, as the fourth generation (4G) mobile communication standard of the 3$^{rd}$ Generation Partnership Project (3GPP), has adopted SC-FDMA as uplink multiplexing scheme.

With the advance of radio communication technologies that provide diverse multimedia service in recent advanced radio communication environments, a high-speed data transmission technique is required to support high quality multimedia services. In order to meet the requirements for high-speed data transmission, diverse research is being conducted and MIMO is one of the techniques upon which much of the research is focused.

MIMO employs multiple antennas to increase channel capacity within given frequency resource limitations. MIMO can produce a channel capacity that is proportional to the number of antennas in a scattering environment. In order to improve the data transmit efficiency of the MIMO technique, the transmit data is coded before transmission, which is commonly referred to as precoding. A precoding rule is defined with a matrix, i.e. a precoding matrix, and a set of precoding matrices is referred to as codebook. In LTE-Advanced (LTE-A), a precoding matrix-based MIMO is one of the key techniques for performance enhancement in uplink transmission in both single-user and multiuser environments.

In uplink of LTE, event-triggered power control is used for Physical Uplink Shared Channel (PUSCH). This means that there is no need to transmit the Transmit Power Control (TPC) periodically.

The PUSCH transmit power calculated for an $i^{th}$ subframe $P_{PUSCH}(i)$ can be expressed by Equation (1):

$$P_{PUSCH}(i) = \min \{P_{CMAX}, 10 \log_{10}(M_{PUSCH}(i)) + P_{O\_PUSCH}(j) + \alpha(j) \cdot PL + \Delta_{TF}(i) + f(i)\}[\text{dBm}] \quad (1)$$

where $P_{CMAX}$ denotes a maximum transmit power according to the power class of the User Equipment (UE). $M_{PUSCH}(i)$ denotes the PUSCH resource allocated in the $i^{th}$ subframe and is expressed by a number of Resource Blocks (RBs). The transmit power of the UE increases in proportion to $M_{PUSCH}(i)$. PL denotes a downlink Path Loss measured by the UE. The scaling factor $\alpha(j)$ is determined by a higher layer in consideration of the PL between uplink and downlink channels for establishing a cell. $P_{O\_PUSCH}$ can be expressed by Equation (2):

$$P_{O\_PUSCH}(j) = P_{O\_NOMINAL\_PUSCH}(j) + P_{O\_UE\_PUSCH}(j) \quad (2)$$

where $P_{O\_NoMINAL\_PUSCH}(j)$ denotes a cell-specific parameter signaled by higher layer. $P_{O\_UE\_PUSCH}(j)$ denotes a UE-specific parameter transmitted by Radio Resource Control (RRC) signaling. The Modulation and Coding Scheme (MCS) or Transport Format (TF) compensation parameter $\Delta_{TF}(i)$ is defined by Equation (3):

$$\Delta_{TF}(i) = \begin{cases} 10\log_{10}(2^{MPR(i) \cdot K_S} - 1) & \text{for } K_S = 1.25 \\ 0 & \text{for } K_S = 0 \end{cases} \quad (3)$$

where MPR(i) is calculated by Equation (4):

$$MPR(i) = \frac{TBS(i)}{M_{PUSCH}(i) \cdot N_{SC}^{RB} \cdot 2N_{Symb}^{UL}} \quad (4)$$

where TBS(i) denotes a transport block size in the $i^{th}$ subframe. In Equation (4), the denominator $M_{PUSCH}(i) \cdot N_{SC}^{RB} \cdot 2N_{Symb}^{UL}$ is the number of Resource Elements (REs) in the subframe. Specifically, the MPR(i) obtained by Equation (4) refers to the amount of information bits per RE. If $K_S=0$, MPR(i)=0, and MCS compensation is not considered. If $K_S=1.25$, only 80% of uplink channel $$\left(\frac{1}{K_s} = 0.8\right)$$

is MCS-compensated. Instantaneous adaptation of PUSCH power control can be expressed by f(i) in Equation (5):

$$f(i) = f(i-1) + \delta_{PUSCH}(i-K_{PUSCH}) \quad (5)$$

where $\delta_{PUSCH}$ denotes a UE-specific parameter included in the PDCCH transmitted from the base station to the UE and is referred to as TPC value. In $\delta_{PUSCH}(i-K_{PUSCH})$, $K_{PUSCH}$ denotes the time difference between for receipt of $\delta_{PUSCH}$ value and application of $\delta_{PUSCH}$ to the transmission subframe of the UE. The $\delta_{PUSCH}$dB accumulation value in DCI format 0 is carried by PDCCH is [−1, 0, 1, 3]. The $\delta_{PUSCH}$dB accumulation value in DCI format 3/3A is carried by PDCCH is [−1, 0, 1, 3].

In addition to the method for accumulating the $\delta_{PUSCH}$ value as in Equation (5), an absolute value of $\delta_{PUSCH}$ can be used as shown in Equation (6). In this case, the absolute value of $\delta_{PUSCH}$ in DCI format 0 is carried by PDCCH is [−4, −1, 1, and 4].

$$f(i)=\delta_{PUSCH}(i-K_{PUSCH}) \tag{6}$$

As described above, it is difficult to apply the power control method for an LTE UE, which transmits a single codeword through a single antenna to the MIMO transmit UE, which transmits multiple codewords through multiple antennas on multiple layers without modification.

SUMMARY OF THE INVENTION

The present invention has been made to address at least the above problems and/or disadvantages and to provide at least the advantages described below. Accordingly, an aspect of the present invention provides a novel power control method of a UE using multiple transmit antennas in an LTE-A system that is capable of mitigating inter-cell interference and improving uplink transmission quality especially in MIMO transmission.

According to an aspect of the present invention, an uplink power control method of a terminal in a mobile communication system is provided. A transmit power for a plurality of transmit antennas is calculated based on a power control parameter received in a downlink. Uplink data is transmitted through the plurality of transmit antennas by applying the transmit power to each of a plurality of codewords.

According to another aspect of the present invention, an uplink power control apparatus of a terminal in a mobile communication system is provided. The uplink power control apparatus includes a plurality of transmit antennas for transmitting uplink data, a power controller that receives a power control parameter in downlink and calculates a transmit power for the plurality of transmit antennas according to the power control parameter. The apparatus also includes a plurality of power amplifiers for applying the transmit power to each of a plurality of codewords to transmit the uplink data through the plurality of transmit antennas.

According to an additional aspect of the present invention, an uplink power control method of a base station in a mobile communication system is provided. A power control parameter configured for a terminal having a plurality of transmit antennas is transmitted. Uplink data transmitted by the terminal through the plurality of transmit antennas is received by applying a transmit power calculated according to the power control parameter to each of a plurality of codewords.

According to a further aspect of the present invention, an uplink power control apparatus of a base station in a mobile communication system is provided. The uplink power control apparatus includes a configuration unit that configures a power control parameter for a terminal having a plurality of transmit antennas, and a transmitter that transmits the power control parameter in downlink. The apparatus also includes a receiver that receives uplink data transmitted by the terminal through the transmit antennas by applying a transmit power calculated according to the power control parameter to each of a plurality of codewords.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
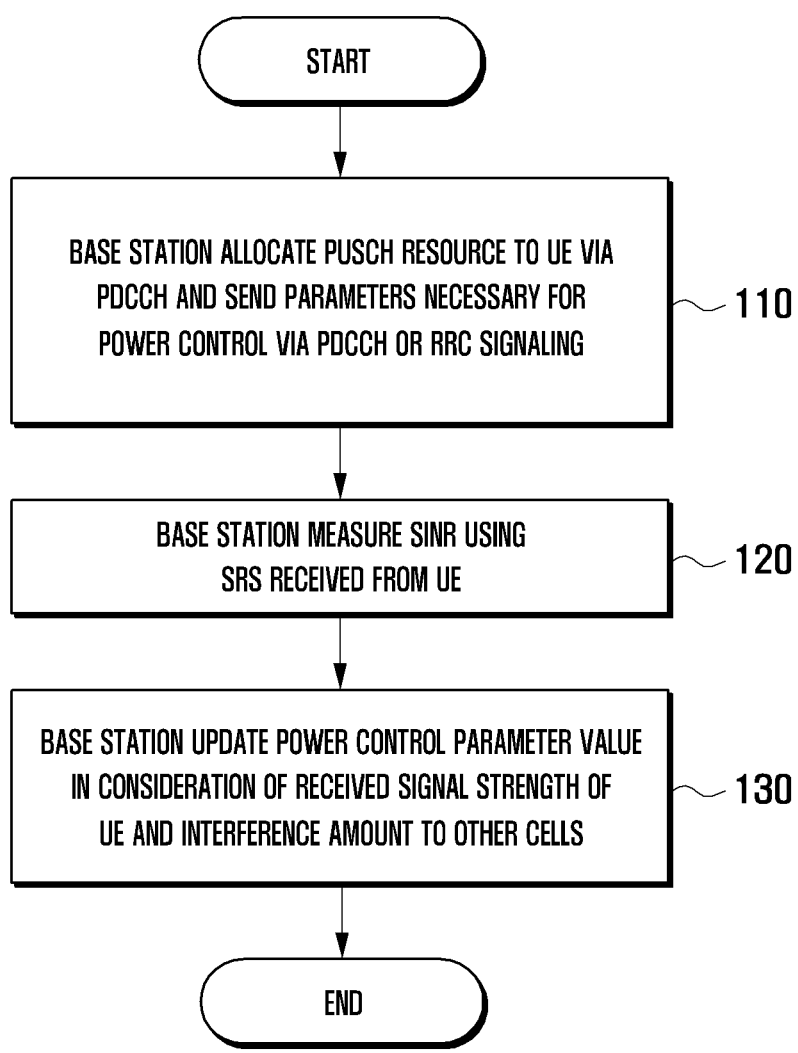
FIG. 1 is a flowchart illustrating a procedure for transmitting power control parameter from a base station to a UE in the LTE and LTE-A system, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but, are merely used by the inventor to enable a clear and consistent understanding of the invention. Accordingly, it should be apparent to those skilled in the art that the following description of embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although a detailed description of the present invention is directed to the OFDM-based mobile communication system, particularly 3GPP Evolved Universal Terrestrial Radio Access (E-UTRA) (referred to as LTE) or Advanced E-UTRA (referred to as LTE-A), it will be understood by those skilled in the art that the present invention can be applied to other communication systems having a similar technical background and channel format, with a slight modification, without departing from the spirit and scope of the present invention.

FIG. 1 is a flowchart illustrating a procedure for transmitting power control parameter from a base station to a UE in the LTE and LTE-A system, according to an embodiment of the present invention.

Referring to FIG. 1, the base station allocates a PUSCH resource to the UE via the PDCCH and delivers parameters necessary for power control via PDCCH or RRC signaling, in step 110. Specifically, the base station determines whether to transmit each power control parameter to the UE by RRC signaling using PDSCH or by PDCCH. If it is determined to use PDCCH (e.g., $\delta_{PUSCH}$), the base station transmits the power control parameter to the UE via PDCCH. Otherwise, if it is determined to use RRC signaling (e.g., $K_S$), the base station transmits the power control parameter by RRC signaling.

The base station measures the Signal to Interference plus Noise Ratio (SINR) of the UE using a Sounding Reference Signal (SRS) transmitted by the UE, in step 120. The base station updates the power control parameter in consideration of the size of the signal transmitted by the UE and the amount of interference of the signal transmitted by the UE to adjacent cells, in step 130, and ends the power control parameter transmission procedure. The updated parameters are transmitted to the UE via the channel determined through the next power control parameter transmission procedure.

In the LTE-A system, PUSCH can be transmitted using up to two codewords, up to four transmission layers, and up to four transmit antennas with the introduction of MIMO. Accordingly, it is impossible to apply the power control method for LTE uplink supporting one codeword, one transmission layer, and one transmit antenna to the LTE-A system directly without modification and thus, a novel uplink power control method for supporting MIMO transmission is required.

Embodiments of the present invention provides a per-layer or per-antenna power control method of a UE supporting multiple antenna transmissions for transmitting PUSCH with uplink power control formulas in an LTE-A system.

Specifically, the base station configures a power control parameter for the UE and transmits the power control parameter in a downlink. The base station is configured so as to receive the uplink data transmitted by the transmit antennas of the UE with the transmit power calculated according to the power control parameter. For this purpose, the base station includes a configuration unit, transmission unit, and reception unit. The configuration unit configures the power control parameter. The transmission unit transmits the power control parameter in the downlink. The reception unit receives uplink data.

A per-layer power control method of the transmitter of the UE using the parameters related to the uplink power control and Transport Block Size (TBS) information that are transmitted by the base station is described in the first and second embodiments of the present invention.

Figure 2:
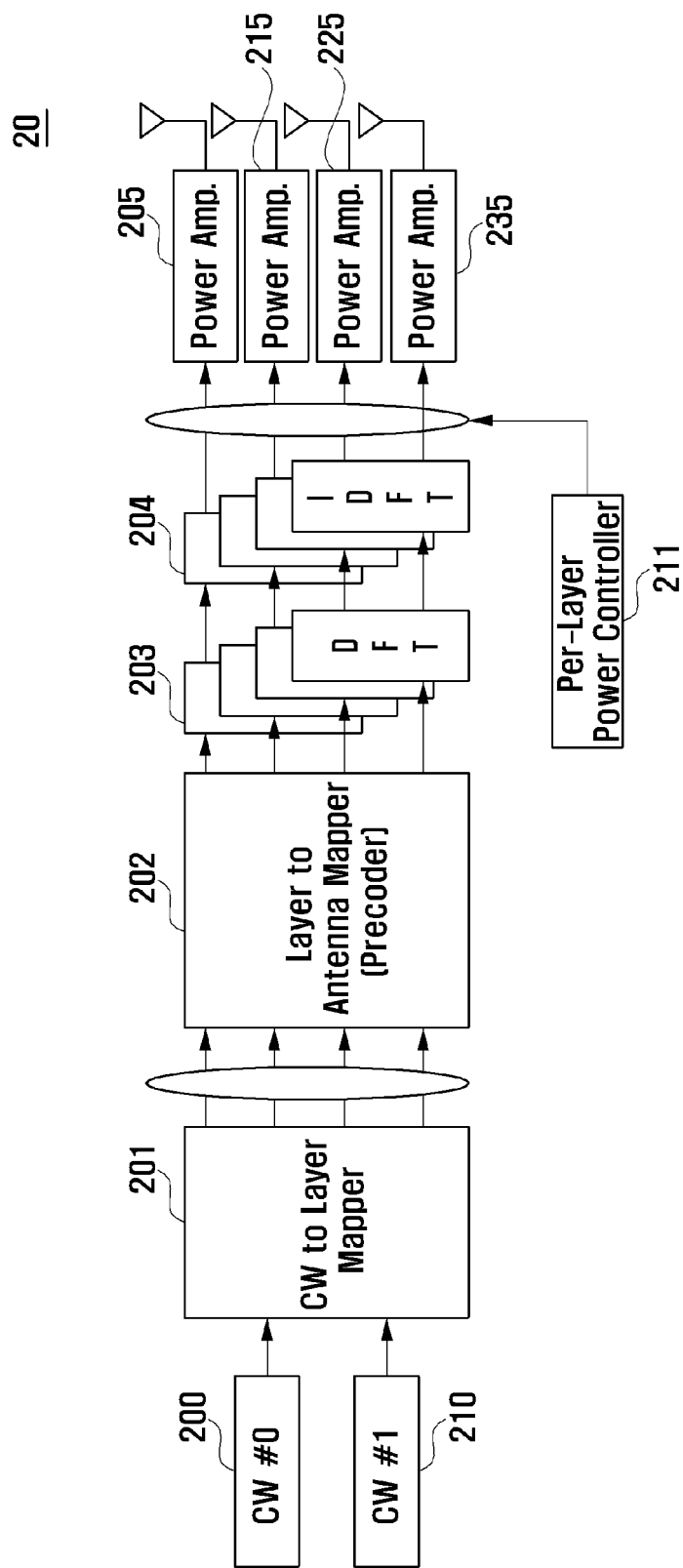
FIG. 2 is a block diagram illustrating a configuration of a UE transmitter, according to first and second embodiments of the present invention.

A description is made of a per-layer transmission power control method of the transmitter of a UE based on the power control parameters transmitted by the base station, with reference to FIG. 2.

FIG. 2 is a block diagram illustrating a configuration of a UE transmitter, according to first and second embodiments of the present invention.

As shown in FIG. 2, the UE 20 includes a first codeword generator 200, a second codeword generator 210, a Layer Mapper 201, an antenna mapper 202, a Discrete Fourier Transform (DFT) performer 203, an Inverse DFT transformer 204, a plurality of Power Amplifiers (PAs) 205, 215, 225, and 235, and a per-layer power controller 211.

The first codeword generator 200 generates codeword CW#0, and the second codeword generator 210 generates codeword CW#1. The layer mapper 201 maps the codewords CW#0 and CW#1 to different layers. The antenna mapper 202 maps the layer-mapped codewords CW#0 and CW#1 to corresponding antennas 202. The DFT performer 203 performs DFT on CW#0 and CW#1, and the IDFT performer 204 performs IDFT on CW#0 and CW#1 into SC-FDMA signal. The individual PAs 205, 215, 225, and 235 correspond to respective transmit antennas, and each PA transmits one of the CW#0 and CW#1 through corresponding antennas. The per-layer power controller 211 provides control such that the PAs 205, 215, 225, and 235 are configured with predetermined values of transmit powers for transmitting per-layer signals output by the layer mapper 201. The per-layer power controller 211 can set the transmit powers for the per-layer signals input to any of the DFT performer 203, the IDFT performer 204, and the PAs 205, 215, 225, and 235.

Specifically, when the power control parameter is received in the downlink, the per-layer power controller 211 sets transmit powers of the transmit antennas to the values calculated based on the power control parameter. The per-layer power controller 211 checks the number of transmission layers. The per-layer power controller 211 determines a power compensation value for the transmission of an index of one of the codewords corresponding to one of the transmission layers and the other codeword corresponding to the other transmission layer, in distributed manner. The per-layer power controller 211 also calculates and sets the transmit power corresponding to one of the transmission layers. Specifically, the per-layer power controller 211 can set the transmit powers of the transmission layers individually. The power amplifiers 205, 215, 225, and 235 transmit the codewords through the corresponding transmit antennas at their respective transmit power levels.

Figure 3:
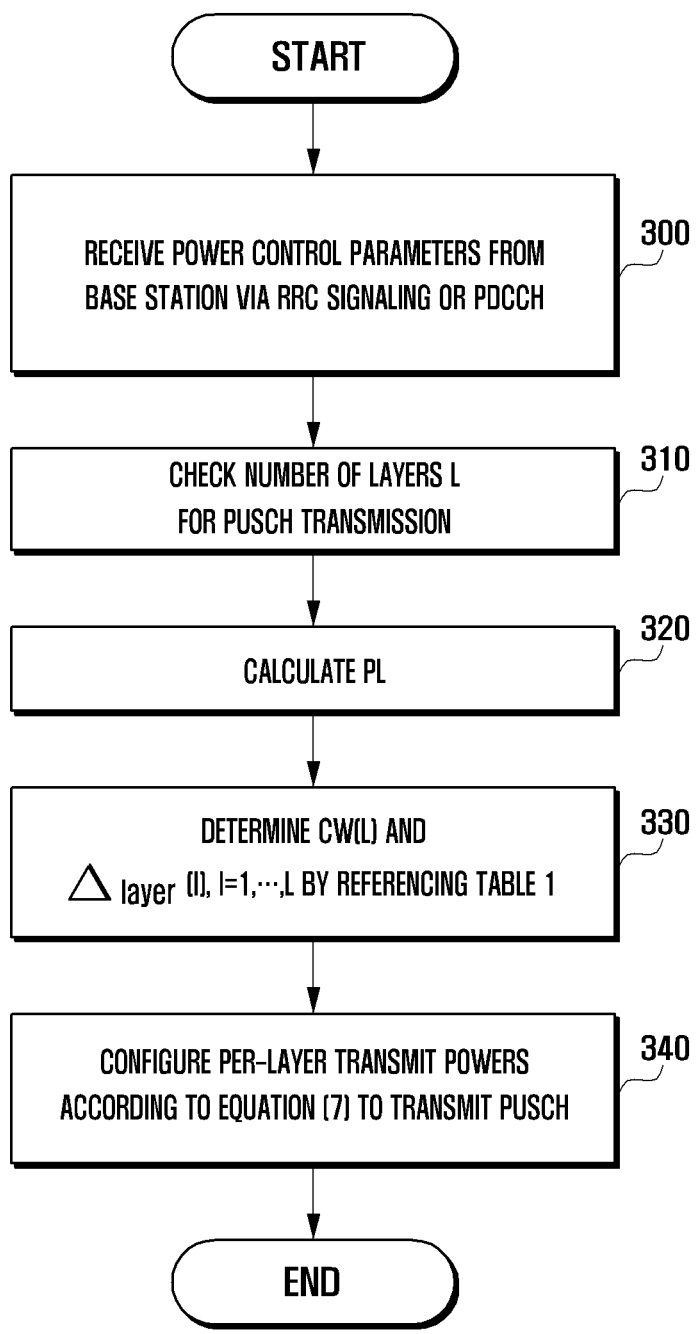
FIG. 3 is a flowchart illustrating the power control method of a UE, according to the first embodiment of the present invention.

FIG. 3 is a flowchart illustrating the power control method of a UE, according to the first embodiment of the present invention.

Referring to FIG. 3, the UE 20 receives the parameters necessary for controlling its transmit power from the base station, in step 300. In order to define the parameters, it is necessary to derive a power control equation for per-layer power control. The per-layer power control equation for the LTE-A system should be configured such that the characteristics of the layer mapper 201 is well reflected, while the influence of the per-layer power control to each codeword does not defy the aim of the power control in the LTE system. Taking this into consideration, the per-layer power control equation for the LTE-A can be expressed as Equation (7) below:

$$P_{PUSCH}(i) = \min\left\{P_{CMAX}, \sum_{l=1}^{L} P_{PUSCH\_layer}(i, l)\right\} \text{ [dBm]} \quad (7)$$

$$P_{PUSCH\_layer}(i, l) = \min\{P_{CMAX\_layer}(l), P_{PUSCH\_layer-CALC}(i, l)\} \text{ [dBm]}$$

$$P_{PUSCH\_layer-CALC}(i, l) = 10\log_{10}(M_{PUSCH}(i)) + P_{O\_PUSCH}(j) +$$

$$\alpha(j) \cdot PL + f(i) + \Delta_{TF}(i, CW(l)) + \Delta_{layer}(l) \text{ [dBm]}$$

where $P_{CMAX}$, $M_{PUSCH}(i)$, $P_{O\_PUSCH}(j)$, $\alpha(j) \cdot PL$, and $f(i)$ are defined in the same manner as Equation (1) as the power control equation for LTE UE using one transmission layer and transmitted from the base station. Here, $f(i)$ can be set differently for codewords and can be modified to $f(i,CW(l))$ in Equation (7). $P_{CMAX\_layer}(l)$ denotes the maximum transmit power per layer and can be a value equal to $P_{CMAX}$, set to $$\frac{P_{CMAX}}{L},$$

or determined as specific values by RRC signaling.

When the sum of the powers of all layers becomes greater than the maximum transmit power, i.e.

$$\left( \sum_{l=1}^{L} P_{PUSCH\_layer}(i, l) > P_{CMAX} \right),$$

it is possible to limit the sum of the transmit powers of all layers below the maximum transmit power by reducing the transmit powers of individual layers. Here, $\delta$ is a value greater than or equal to 0 for reducing the per-layer powers.

$\Delta_{TF}(i,q)$ is a value configured differently per codeword according to Equation (8) to reflect the spectral efficiency of CW#q to the usage power. $K_S$ is an indicator for determining the power compensation value according to the spectral efficiency per codeword.

$$\Delta_{TF}(i, q) = \begin{cases} 10\log_{10}(2^{MPR(i,q) \cdot K_S} - 1), & K_S = 1.25, \\ 0, & K_S = 0, \end{cases} \quad (8)$$

where $MPR(i,q)$ is calculated by equation (9):

$$MPR(i, q) = \frac{TBS(i, q)}{M_{PUSCH}(i) \cdot N_{sc}^{RB} \cdot (2N_{symb}^{UL})}. \quad (9)$$

TBS(i,q) denotes the transport block size of CW#q. In Equation (7), CW(l) denotes the index of the codeword mapped to $l^{th}$ layer, and $\Delta_{layer}(l)$ denotes the value for compensating the power when one codeword is transmitted as distributed on multiple layers. Taking into consideration of the layer mapper 201 to be used in LTE-A system, the number of layers L and CW(l) and $\Delta_{layer}(l)$ for layer index are shown in Table 1.

Referring to the case of L=3 in Table 1, the first layer (l=1) is mapped to CW#0 and the second and third layers (l=2, 3) are mapped to CW#1, such that CW(1), CW(2), and CW(3) are set to 0, 1, and 1 respectively. CW#1 is transmitted as distributed on the second and third layers such that $\Delta_{layer}(\mathbf{2})$ and $\Delta_{layer}(\mathbf{3})$ are set to $-\gamma_{3dB}=-10\log_{10}2$ dBm to compensate for the per-layer power as much as half. $\Delta_{layer}(l)$ used for compensating the power, when one codeword is transmitted on multiple layers, is configured to relate the power displacement for the variation of spectral efficiency only to $\Delta_{TF}(i,q)$ in the power control equation, thereby avoiding violation of the power control method of the LTE system.

Referring again to FIG. 2, after receiving the power control parameters in Equation (7) at step 300, the UE 20 checks the number of transmission layers L to be used for $i^{th}$ transmission, in step 310. The number of layers L can be informed to the UE 20 by the base station. The UE 20 calculates downlink PL, in step 320. The PL are set to the same value for the transmit antennas. The UE determines the CW(l) and $\Delta_{layer}(l)$ per layer, in step 330, and configures the transmit power per layer according to Equation (5) to transmit PUSCH, in step 340.

The base station of the LTE-A system, according to the first embodiment of the present invention, follows the power control procedure of FIG. 1, and the parameters necessary for the power control are transmitted for use in Equation (7).

Figure 4:
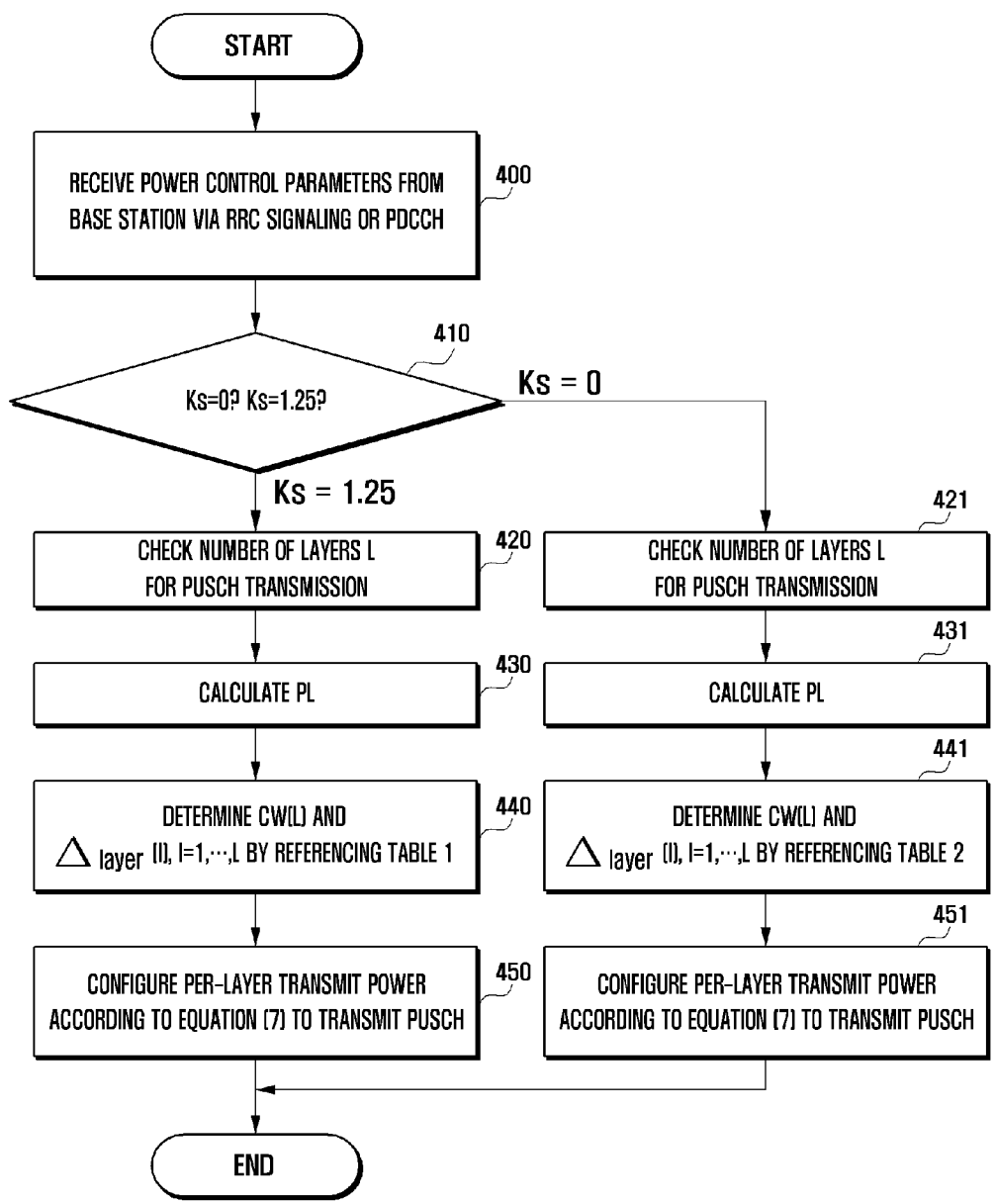
FIG. 4 is a flowchart illustrating the power control method of a UE, according to the second embodiment of the present invention.

FIG. 4 is a flowchart illustrating the power control method of a UE, according to the second embodiment of the present invention. Unlike the first embodiment in which the UE 20 configures $\Delta_{layer}(l)$ regardless of $K_S$ received from the base station, the UE 20 configures $\Delta_{layer}(l)$ based on $K_S$ received from the base station in this second embodiment.

Referring to FIG. 4, the UE 20 receives power control parameters via RRC signaling or PDCCH, in step 400. The UE 20 checks whether $K_s$ is 1.25 or 0, in step 410.

If $K_s$ is 1.25, the UE 20 checks the number of transmission layers L to be used for PUSCH transmission, in step 420. The base station can inform the UE 20 of number of layers L. The UE 20 calculates downlink PL, in step 430. The antennas are configured with the same PL. The UE 20 determines CW(l) and $\Delta_{layer}(l)$ per layer by referencing Table 1, in step 440. The UE 20 configures the transmit power for each layer according to Equation (7) and transmits PUSCH at the transmit power level, in step 450.

If $K_s$ is 0 at step 410, the UE 20 checks the number of transmission layers necessary for PUSCH transmission in step 421, and calculates PL in step (431). The transmission antennas are configured with the same PL. The UE determines CW(l) and $\Delta_{layer}(l)$ per layer by referencing Table 2, in step 441.

TABLE 1

| Layer index | L = 1 | | L = 2 | | L = 3 | | L = 4 | |
|---|---|---|---|---|---|---|---|---|
| | CW(l) | $\Delta_{layer}(l)$ | CW(l) | $\Delta_{layer}(l)$ | CW(l) | $\Delta_{layer}(l)$ | CW(l) | $\Delta_{layer}(l)$ |
| l = 1 | 0 | 0 | 0 | 0 | 0 | 0 | 0 | $-\gamma_{3\,dB}$ |
| l = 2 | | | 1 | 0 | 1 | $-\gamma_{3\,dB}$ | 0 | $-\gamma_{3\,dB}$ |
| l = 3 | | | | | 1 | $-\gamma_{3\,dB}$ | 1 | $-\gamma_{3\,dB}$ |
| l = 4 | | | | | | | 1 | $-\gamma_{3\,dB}$ |

TABLE 2

| Layer | L = 1 | | L = 2 | | L = 3 | | L = 4 | |
|---|---|---|---|---|---|---|---|---|
| index | CW(l) | $\Delta_{layer}(l)$ | CW(l) | $\Delta_{layer}(l)$ | CW(l) | $\Delta_{layer}(l)$ | CW(l) | $\Delta_{layer}(l)$ |
| l = 1 | 0 | 0 | 0 | $-\gamma_{3\,dB}$ | 0 | $-\gamma_{3\,dB}$ | 0 | $-2\gamma_{3\,dB}$ |
| l = 2 | | | 1 | $-\gamma_{3\,dB}$ | 1 | $-2\gamma_{3\,dB}$ | 0 | $-2\gamma_{3\,dB}$ |
| l = 3 | | | | | 1 | $-2\gamma_{3\,dB}$ | 1 | $-2\gamma_{3\,dB}$ |
| l = 4 | | | | | | | 1 | $-2\gamma_{3\,dB}$ |

Table 2 shows the case where two codewords are transmitted by reducing the transmit powers of the layers to half, such that the sum of the transmit powers are equal to that for transmitting one codeword. Like LTE, in which $K_s$ is set to 0 in order to prevent the transmit power of the UE from varying frequently according to the spectral efficiency, if $K_s$ is set to 0 in LTE-A, it is necessary for the UE to configure such that transmit power does not vary according to the number of codewords.

The UE 20 calculates the transmit power of each layer according to Equation (7) and transmits PUSCH at the transmit power level, in step 451.

In the LTE-A system, according to the second embodiment of the present invention, the base station follows the power control procedure of FIG. 1, and the parameters necessary for power control are transmitted for use in Equation (7).

A description is made of a per-antenna power control method of the transmitter of a UE based on the parameters related to the uplink power control and TBS information that are transmitted by the base station, according to the third and fourth embodiments of the present invention.

Figure 5:
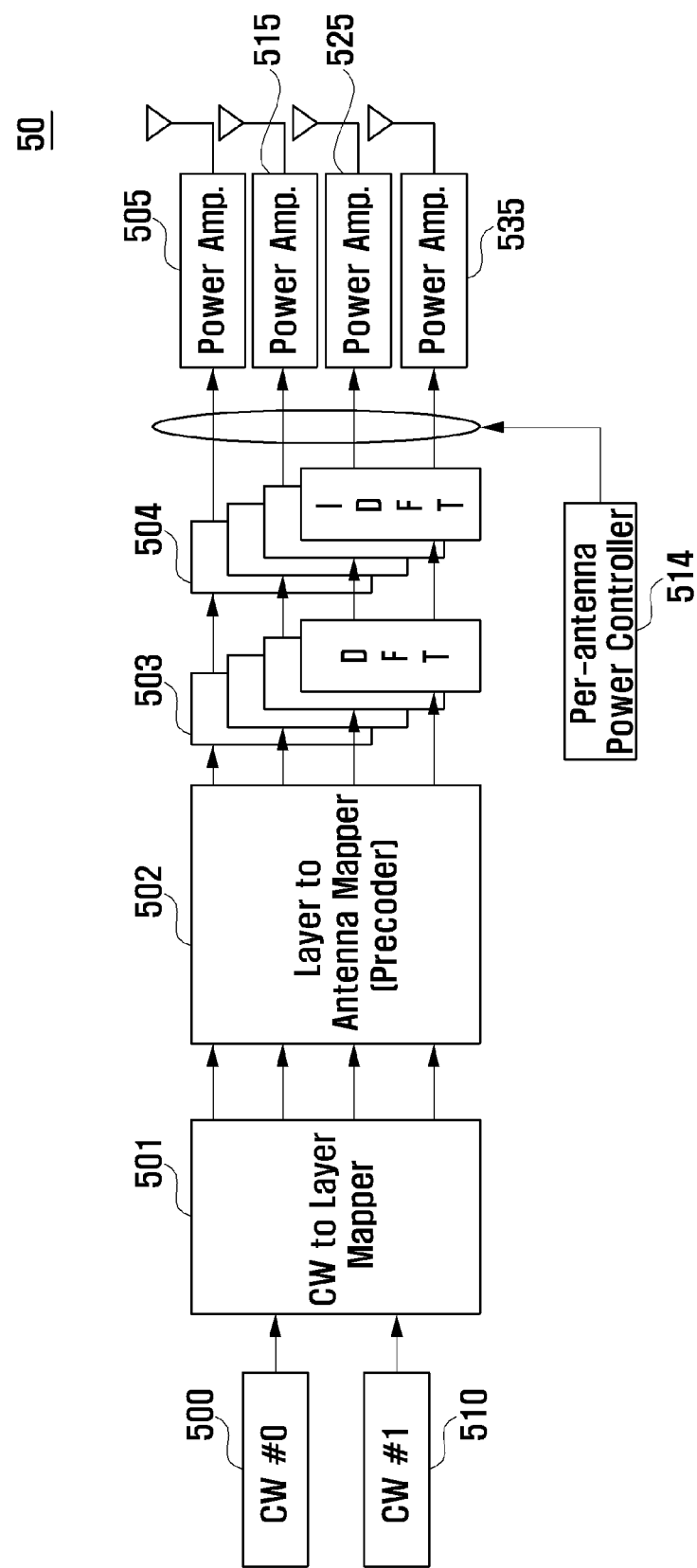
FIG. 5 is a block diagram illustrating a configuration of a UE transmitter, according to third, fourth, fifth, sixth, and seventh embodiments of the present invention.

FIG. 5 is a block diagram illustrating a configuration of a UE transmitter, according to third, fourth, fifth, sixth, and seventh embodiments of the present invention.

As shown in FIG. 5, a UE 50 includes a first codeword generator 500, a second codeword generator 510, a layer mapper 501, an antenna mapper 502, a DFT performer 503, a IDFT performer 504, a plurality of PAs 505, 525, 525, and 535, and a per-antenna power controller 514.

The first codeword generator 500 generates codeword CW#0, and the second codeword generator 510 generates codeword CW#1. The layer mapper 501 maps the codewords CW#0 and CW#1 to corresponding layers. The antenna mapper 502 maps the layer-mapped codewords CW#0 and CW#1 to corresponding antennas. The DFT performer 503 performs DFT on the codewords CW#0 and CW#1, and the IDFT performer 504 performs DFT on the codewords CW#0 and CW#1 to output SC-FDMA signal. The individual PAs 505, 515, 525, and 535 correspond to the respective transmit antennas and are configured with a respective transmit power to transmit the CW#0 and CW#1 through corresponding antennas. The per-antenna power controller 514 provides controls such that the PAs 505, 515, 525, and 535 are configured with predetermined values of transmit powers for transmitting per-antenna signals output by the layer mapper 501. The per-antenna power controller 514 can set the transmit powers for the per-antenna signals input to any of the DFT performer 503, the IDFT performer 504, and the PAs 505, 515, 525, and 535. Specifically, when the power control parameter is received in the downlink, the per-antenna power controller 514 sets transmit powers of the transmit antennas to the values calculated based on the power control parameter. The per-layer power controller 514 checks the number of transmit antennas, the number of layers, and the precoding matrix indices corresponding to the transmit antennas. The per-antenna power controller 514 determines a power compensation value for the transmission of an index of one of the codewords corresponding to one of the transmission layers and the other codeword corresponding to the other transmission layer, in distributed manner. The per-antenna power controller 514 also calculates and sets the transmit power corresponding to one of the transmission antennas. If the receiver-specific characteristic of codeword, i.e. parameter for identifying the receiver is received, the per-antenna power controller 514 can adjust the transmit power for one of the codewords corresponding to the receiver. When transmitting one of the codewords as distributed on at least two layers, the per-antenna power controller 514 can calculate the transmit power per transmission layer corresponding to one of the codewords. The per-antenna power controller 514 also can determine the power compensation value to be applied to the codeword identically and calculate the transmit power per transmit antenna corresponding to each codeword. Specifically, the per-antenna power controller 514 configures the transmit power corresponding to each transmit antenna. The PAs 505, 515, 525, and 535 controls codewords to be transmitted through corresponding antennas at the respective transmit power levels.

Figure 6:
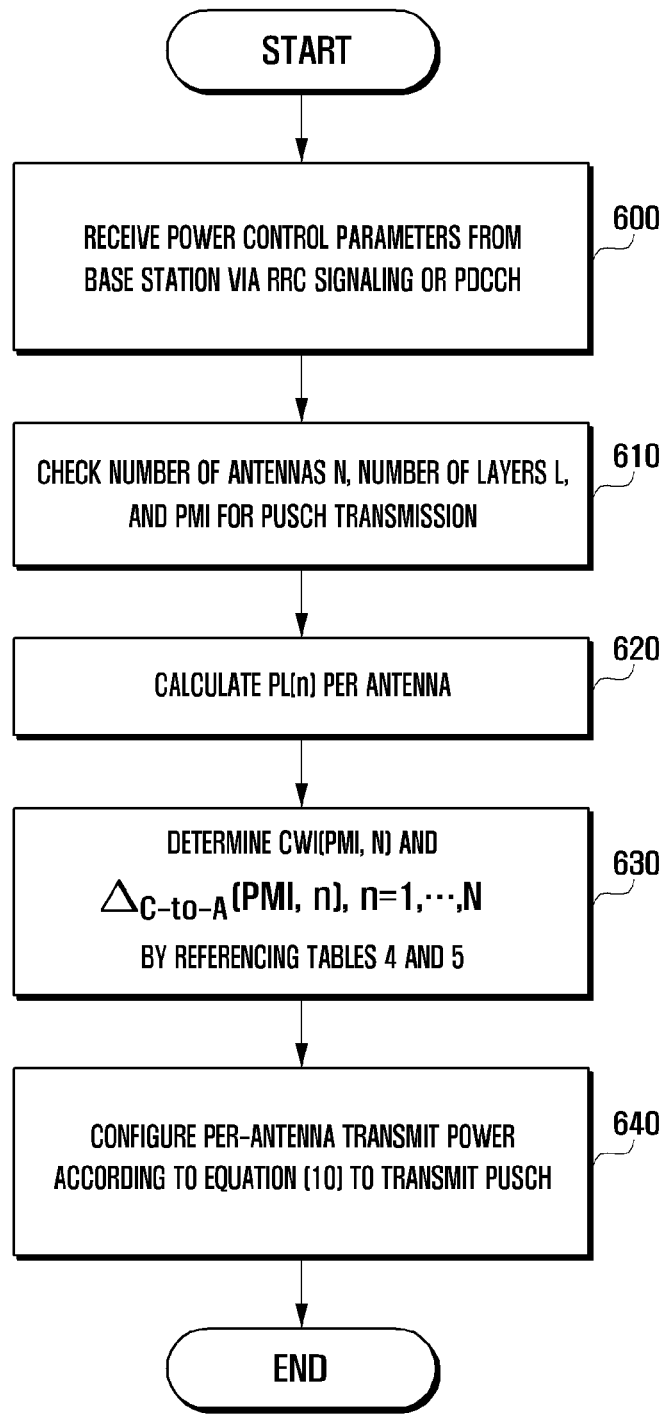
FIG. 6 is a flowchart illustrating the power control method of a UE, according to the third embodiment of the preset invention.

FIG. 6 is a flowchart illustrating the power control method of a UE, according to the third embodiment of the preset invention.

Referring to FIG. 6, the UE 50 receives the parameters necessary for its transmit power control from the base station. In order to define the parameters, it is necessary to derive a power control equation for per-layer power control. The per-layer power control equation for the LTE-A system should be configured such that the characteristics of the antenna mappers 501 and 502 are well reflected, while the influence of the per-antenna power control to each codeword does not defy the aim of the power control in the LTE system. In consideration of this, the per-antenna power control equation for LTE-A can be expressed as Equation (10) below:

$$P_{PUSCH}(i) = \min\left\{P_{CMAX}, \sum_{n=1}^{N} P_{PUSCH,ant}(i, n)\right\} \text{ [dBm]} \quad (10)$$

$$P_{PUSCH\_ant}(i, n) = \min\{P_{CMAX\_ant}(n), P_{PUSCH\_ant-CALC}(i, n)\} \text{ [dBm]}$$

$$P_{PUSCH\_ant-CALC}(i, n) = 10\log_{10}(M_{PUSCH}(i)) + P_{O\_PUSCH}(j) + f(i) +$$
$$\Delta_{TF}(i, CWI(PMI, n)) + \Delta_{C-to-A}(PMI, n) + \alpha(j)PL(n) \text{ [dBm]}$$

where $P_{CMAX}$, $M_{PUSCH}(i)$, $P_{O\_PUSCH}(j)$, $f(i)$, $\alpha(j)$, and $\Delta_{TF}(i, q)$ are defined in the same manner as Equation (7). f(i) can be determined per codeword. $P_{CMAX\_ant}(n)$ denotes the maximum transmit power per antenna which can be equal to $P_{CMAX}$, set to $P_{CMAX}/N$, or determined as specific values by RRC signaling.

When the sum of the powers of all antennas becomes greater than the maximum transmit power, i.e.

$$\sum_{n=1}^{N} P_{PUSCH\_ant}(i, n) > P_{CMAX},$$

it is possible to limit the sum of the transmit powers of all antennas below the maximum transmit power by reducing the transmit powers of individual antennas. δ is a value equal to or greater than 0 for reducing the per-layer powers.

PL(n) denotes the downlink path-loss measured by the UE 50 and can be set differently per antenna. CWI(PMI, n) denotes an index of the codeword mapped to $n^{th}$ antenna for a given Precoding Matrix Index (PMI), and $\Delta_{C\text{-}to\text{-}A}$(PMI,n) is for compensating power when one codeword is transmitted through multiple antennas. The precoding matrices for uplink MIMO transmission expected to be used in LTE-A system are shown in Table 3.

TABLE 3

| | | PMI | Precoder Matrices |
|---|---|---|---|
| N = 2 | L = 1 | 0~5 | $\frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix}, \frac{1}{\sqrt{2}}\begin{bmatrix}1\\0\end{bmatrix}, \frac{1}{\sqrt{2}}\begin{bmatrix}0\\1\end{bmatrix}$ |
| | L = 2 | 0 | $\frac{1}{\sqrt{2}}\begin{bmatrix}1 & 0\\0 & 1\end{bmatrix}$ |
| N = 4 | L = 1 | 0~7 | $\frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\-1\end{bmatrix}, \frac{1}{2}\begin{bmatrix}1\\j\\-1\\-j\end{bmatrix}, \frac{1}{2}\begin{bmatrix}1\\j\\-j\\-1\end{bmatrix}$ |
| | | 8~15 | $\frac{1}{2}\begin{bmatrix}1\\-1\\1\\1\end{bmatrix}, \frac{1}{2}\begin{bmatrix}1\\-1\\j\\-j\end{bmatrix}, \frac{1}{2}\begin{bmatrix}1\\-1\\-1\\-1\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \frac{1}{2}\begin{bmatrix}1\\-j\\j\\-1\end{bmatrix}, \frac{1}{2}\begin{bmatrix}1\\-j\\-1\\j\end{bmatrix}, \frac{1}{2}\begin{bmatrix}1\\-j\\-j\\1\end{bmatrix}$ |
| | | 16~23 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}$ |
| N = 4 | L = 2 | 0~3 | $\frac{1}{2}\begin{bmatrix}1 & 0\\1 & 0\\0 & 1\\0 & -j\end{bmatrix}, \frac{1}{2}\begin{bmatrix}1 & 0\\1 & 0\\0 & 1\\0 & j\end{bmatrix}, \frac{1}{2}\begin{bmatrix}1 & 0\\-j & 0\\0 & 1\\0 & 1\end{bmatrix}, \frac{1}{2}\begin{bmatrix}1 & 0\\-j & 0\\0 & 1\\0 & -1\end{bmatrix}$ |
| | | 4~7 | $\frac{1}{2}\begin{bmatrix}1 & 0\\-1 & 0\\0 & 1\\0 & -j\end{bmatrix}, \frac{1}{2}\begin{bmatrix}1 & 0\\-1 & 0\\0 & 1\\0 & j\end{bmatrix}, \frac{1}{2}\begin{bmatrix}1 & 0\\j & 0\\0 & 1\\0 & 1\end{bmatrix}, \frac{1}{2}\begin{bmatrix}1 & 0\\j & 0\\0 & 1\\0 & -1\end{bmatrix}$ |
| | | 8~11 | $\frac{1}{2}\begin{bmatrix}1 & 0\\0 & 1\\1 & 0\\0 & 1\end{bmatrix}, \frac{1}{2}\begin{bmatrix}1 & 0\\0 & 1\\1 & 0\\0 & -1\end{bmatrix}, \frac{1}{2}\begin{bmatrix}1 & 0\\0 & 1\\-1 & 0\\0 & 1\end{bmatrix}, \frac{1}{2}\begin{bmatrix}1 & 0\\0 & 1\\-1 & 0\\0 & -1\end{bmatrix}$ |
| | | 12~15 | $\frac{1}{2}\begin{bmatrix}1 & 0\\0 & 1\\0 & 1\\1 & 0\end{bmatrix}, \frac{1}{2}\begin{bmatrix}1 & 0\\0 & 1\\0 & -1\\1 & 0\end{bmatrix}, \frac{1}{2}\begin{bmatrix}1 & 0\\0 & 1\\0 & 1\\-1 & 0\end{bmatrix}, \frac{1}{2}\begin{bmatrix}1 & 0\\0 & 1\\0 & -1\\-1 & 0\end{bmatrix}$ |
| | L = 3 | 0~3 | $\frac{1}{2}\begin{bmatrix}1 & 0 & 0\\1 & 0 & 0\\0 & 1 & 0\\0 & 0 & 1\end{bmatrix}, \frac{1}{2}\begin{bmatrix}1 & 0 & 0\\-1 & 0 & 0\\0 & 1 & 0\\0 & 0 & 1\end{bmatrix}, \frac{1}{2}\begin{bmatrix}1 & 0 & 0\\0 & 1 & 0\\1 & 0 & 0\\0 & 0 & 1\end{bmatrix}, \frac{1}{2}\begin{bmatrix}1 & 0 & 0\\0 & 1 & 0\\-1 & 0 & 0\\0 & 0 & 1\end{bmatrix}$ |
| | | 4~7 | $\frac{1}{2}\begin{bmatrix}1 & 0 & 0\\0 & 1 & 0\\0 & 0 & 1\\1 & 0 & 0\end{bmatrix}, \frac{1}{2}\begin{bmatrix}1 & 0 & 0\\0 & 1 & 0\\0 & 0 & 1\\-1 & 0 & 0\end{bmatrix}, \frac{1}{2}\begin{bmatrix}0 & 1 & 0\\1 & 0 & 0\\1 & 0 & 0\\0 & 0 & 1\end{bmatrix}, \frac{1}{2}\begin{bmatrix}0 & 1 & 0\\1 & 0 & 0\\-1 & 0 & 0\\0 & 0 & 1\end{bmatrix}$ |

TABLE 3-continued

| PMI | Precoder Matrices |
|---|---|
| 8~11 | $\frac{1}{2}\begin{bmatrix} 0 & 1 & 0 \\ 1 & 0 & 0 \\ 0 & 0 & 1 \\ 1 & 0 & 0 \end{bmatrix}, \frac{1}{2}\begin{bmatrix} 0 & 1 & 0 \\ 1 & 0 & 0 \\ 0 & 0 & 1 \\ -1 & 0 & 0 \end{bmatrix}, \frac{1}{2}\begin{bmatrix} 0 & 1 & 0 \\ 0 & 0 & 1 \\ 1 & 0 & 0 \\ 1 & 0 & 0 \end{bmatrix}, \frac{1}{2}\begin{bmatrix} 0 & 1 & 0 \\ 0 & 0 & 1 \\ 1 & 0 & 0 \\ -1 & 0 & 0 \end{bmatrix}$ |
| L = 4   0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

Taking into consideration of the layer mapper 501 and precoding matrices of Table 3 that are expected to be used in LTE-A system, CWI(PMI, n) and $\Delta_{C\text{-}to\text{-}A}$(PMI,n) to the number of antennas N and the number of layers L are shown in Tables 4 and 5 respectively.

TABLE 4

|  |  | PMI | [CWI(PMI, 1), ..., CWI(PMI, N)] |
|---|---|---|---|
| N = 2 | L = 1 | 0~3 | [0, 0] |
|  |  | 4 | [0, x] |
|  |  | 5 | [x, 0] |
|  | L = 2 | 0 | [0, 1] |
| N = 4 | L = 1 | 0~15 | [0, 0, 0, 0] |
|  |  | 16~19 | [0, x, 0, x] |
|  |  | 20~23 | [x, 0, x, 0] |
|  | L = 2 | 0~7 | [0, 0, 1, 1] |
|  |  | 8~11 | [0, 1, 0, 1] |
|  |  | 12~15 | [0, 1, 1, 0] |
|  | L = 3 | 0, 1 | [0, 0, 1, 1] |
|  |  | 2, 3 | [0, 1, 0, 1] |
|  |  | 4, 5 | [0, 1, 1, 0] |
|  |  | 6, 7 | [1, 0, 0, 1] |
|  |  | 8, 9 | [1, 0, 1, 0] |
|  |  | 10, 11 | [1, 1, 0, 0] |
|  | L = 4 | 0 | [0, 0, 1, 1] |

TABLE 5

|  |  | PMI | [$\Delta_{C\text{-}to\text{-}A}$(PMI, 1), ..., $\Delta_{C\text{-}to\text{-}A}$(PMI, N)] |
|---|---|---|---|
| N = 2 | L = 1 | 0~3 | [$-\gamma_{3\,dB}, -\gamma_{3\,dB}$] |
|  |  | 4 | [$-\gamma_{3\,dB}, -\infty$] |
|  |  | 5 | [$-\infty, -\gamma_{3\,dB}$] |
|  | L = 2 | 0 | [0, 0] |
| N = 4 | L = 1 | 0~15 | [$-2\gamma_{3\,dB}, -2\gamma_{3\,dB}, -2\gamma_{3\,dB}, -2\gamma_{3\,dB}$] |
|  |  | 16~19 | [$-2\gamma_{3\,dB}, -\infty, -2\gamma_{3\,dB}, -\infty$] |
|  |  | 20~23 | [$-\infty, -2\gamma_{3\,dB}, -\infty, -2\gamma_{3\,dB}$] |
|  | L = 2 | 0~15 | [$-\gamma_{3\,dB}, -\gamma_{3\,dB}, -\gamma_{3\,dB}, -\gamma_{3\,dB}$] |
|  | L = 3 | 0~11 | [$-\gamma_{3\,dB}, -\gamma_{3\,dB}, -\gamma_{3\,dB}, -\gamma_{3\,dB}$] |
|  | L = 4 | 0 | [$-\gamma_{3\,dB}, -\gamma_{3\,dB}, -\gamma_{3\,dB}, -\gamma_{3\,dB}$] |

When N=4 and L=3 in Tables 4 and 5, when PMI is 4, CW#0 is mapped to the first and fourth antennas and CW#1 is mapped to the second and third antennas, such that CW(1) and CW(4) are set to 0 and CW(2) and CW(3) are set to 1. When N=4 and L=3, both the two codewords pass the layer mapper 501 and the antenna mapper 502, and then are transmitted through two antennas as distributed such that $\Delta_{C\text{-}to\text{-}A}$(PMI,n) is set to $-\gamma_{3dB} = -10\log_{10}2$ to compensate the transmit power per antenna to half.

After receiving the power control parameters for use in Equation (10) at step 600, the UE 50 checks the number of transmission layers L, the number of antennas N, and the PMI to be used in $i^{th}$ transmission, in step 610. The UE 50 calculates downlink path-loss PL(n) per antenna, in step 620. PL(n) can be set differently or identically for the transmit antennas. When the PL(n) is set differently for the transmit antennas, the UE 50 calculates the PL to be commonly applied to the transmit antennas. The UE 50 determines CWI(PMI, n) and $\Delta_{C\text{-}to\text{-}A}$(PMI,n) to be used per antenna by referencing Tables 4 and 5 in step 630 and configures the per-antenna transmit powers using Equation 10.

In the LTE-A system according to the third embodiment of the present invention, the base station follows the power control procedure of FIG. 1, and the parameters necessary for the power control are transmitted for use in Equation (10).

Figure 7:
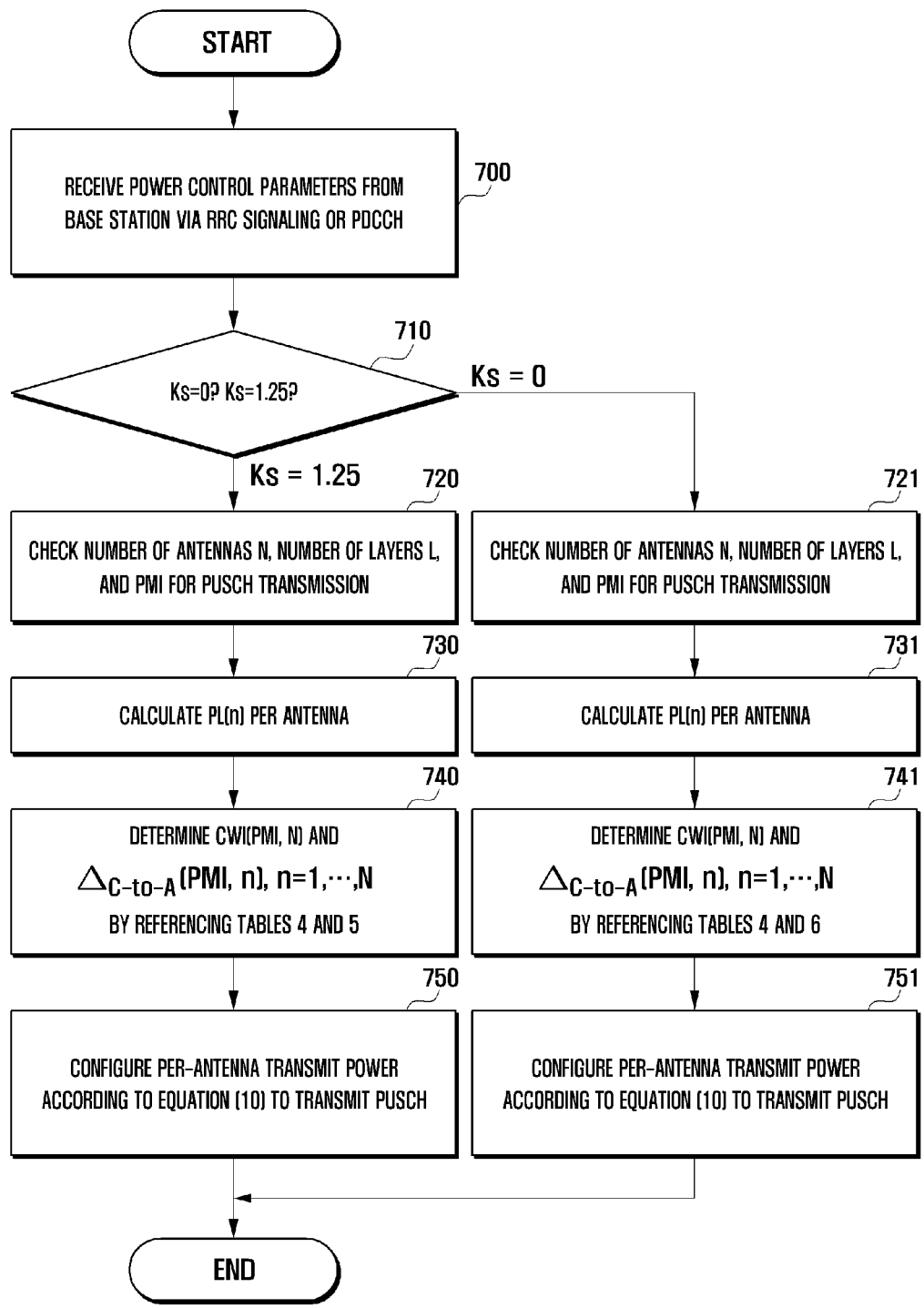
FIG. 7 is a flowchart illustrating the power control method of a UE, according to fourth embodiment of the present invention.

FIG. 7 is a flowchart illustrating the power control method of a UE, according to the fourth embodiment of the present invention. Unlike the previous embodiment, in which the UE 50 determines the power control value with the configuration of $\Delta_{C\text{-}to\text{-}A}$ (PMI,n) regardless of $K_S$ received from the base station, the UE 50 configures $\Delta_{C\text{-}to\text{-}A}$ (PMI,n) based on $K_S$ received from the base station in this fourth embodiment.

Referring to FIG. 7, the UE 50 receives the power control parameters via RRC signaling or PDCCH, in step 700. The UE 50 checks whether $K_s$ is 1.25 or 0, in step 710.

If $K_s$ is 1.25, the UE 50 checks the number of transmission layers L, the number of transmit antennas N, and the PMI to be used for PUSCH transmission in step 720 and calculates downlink path-loss PL(n) per antenna, in step 730. The transmit antennas can be configured with different values or the same value of PL(n). When the antennas are configured with different values of PL(n), the UE 50 can calculate the PL to be commonly applied to the transmit antennas. The UE 50 determines CWI(PMI, n) and $\Delta_{C\text{-}to\text{-}A}$(PMI,n) per antenna by referencing Tables 4 and 5, in step 740. The UE 50 sets the transmit power per antenna according to Equation (10) and transmits PUSCH at the transmit power level, in step 750.

If $K_s$ is 0 at step 710, the UE 50 checks the number of transmission layers L, the number of transmit antennas N, and the PMI necessary for PUSCH transmission in step 721 and calculates downlink path-loss per antenna PL(n) in step 731. The transmission antennas are configured with the same PL. The UE determines CW(l) and $\Delta_{layer}$(l) per layer by referencing Table 2, in step 441. The transmit antennas can be configured with different values of PN(n) or the same value of PN(n). When the transmit antennas are configured with different values of PL(n), the UE 50 can calculate PL to be commonly applied to the transmit antennas. Next, the UE 50 determines CWI(PMI, n) and $\Delta_{C\text{-}to\text{-}A}$(PMI,n) per layer by referencing Tables 4 and 6, in step 741.

TABLE 6

|  |  | PMI | $[\Delta_{C\text{-}to\text{-}A}(\text{PMI}, 1), \ldots, \Delta_{C\text{-}to\text{-}A}(\text{PMI}, N)]$ |
|---|---|---|---|
| N = 2 | L = 1 | 0~3 | $[-\gamma_{3\,dB}, -\gamma_{3\,dB}]$ |
|  |  | 4 | $[-\gamma_{3\,dB}, -\infty]$ |
|  |  | 5 | $[-\infty, -\gamma_{3\,dB}]$ |
|  | L = 2 | 0 | $[-\gamma_{3\,dB}, -\gamma_{3\,dB}]$ |
| N = 4 | L = 1 | 0~15 | $[-2\gamma_{3\,dB}, -2\gamma_{3\,dB}, -2\gamma_{3\,dB}, -2\gamma_{3\,dB}]$ |
|  |  | 16~19 | $[-2\gamma_{3\,dB}, -\infty, -2\gamma_{3\,dB}, -\infty]$ |
|  |  | 20~23 | $[-\infty, -2\gamma_{3\,dB}, -\infty, -2\gamma_{3\,dB}]$ |
|  | L = 2 | 0~15 | $[-2\gamma_{3\,dB}, -2\gamma_{3\,dB}, -2\gamma_{3\,dB}, -2\gamma_{3\,dB}]$ |
|  | L = 3 | 0~11 | $[-2\gamma_{3\,dB}, -2\gamma_{3\,dB}, -2\gamma_{3\,dB}, -2\gamma_{3\,dB}]$ |
|  | L = 4 | 0 | $[-2\gamma_{3\,dB}, -2\gamma_{3\,dB}, -2\gamma_{3\,dB}, -2\gamma_{3\,dB}]$ |

Table 6 shows the case where two codewords are transmitted by reducing the transmit powers of the individual layers to half such that the sum of the transmit powers are equal to that for transmitting one codeword. Like LTE, in which $K_s$ is set to 0 in order to prevent the transmit power of the UE from varying frequently according to the spectral efficiency, if $K_s$ is set to 0 in LTE-A, it is necessary for the UE 50 to be configured such that the transmit power does not vary according to the number of codewords.

The UE 50 configures the transmit power per antenna according to Equation (10) and transmits PUSCH at the transmit level, in step 751.

In the LTE-A system according to the fourth embodiment of the present invention, the base station follows the power control procedure of FIG. 1, and the parameters necessary for power control are transmitted for use in Equation (10).

Figure 8:
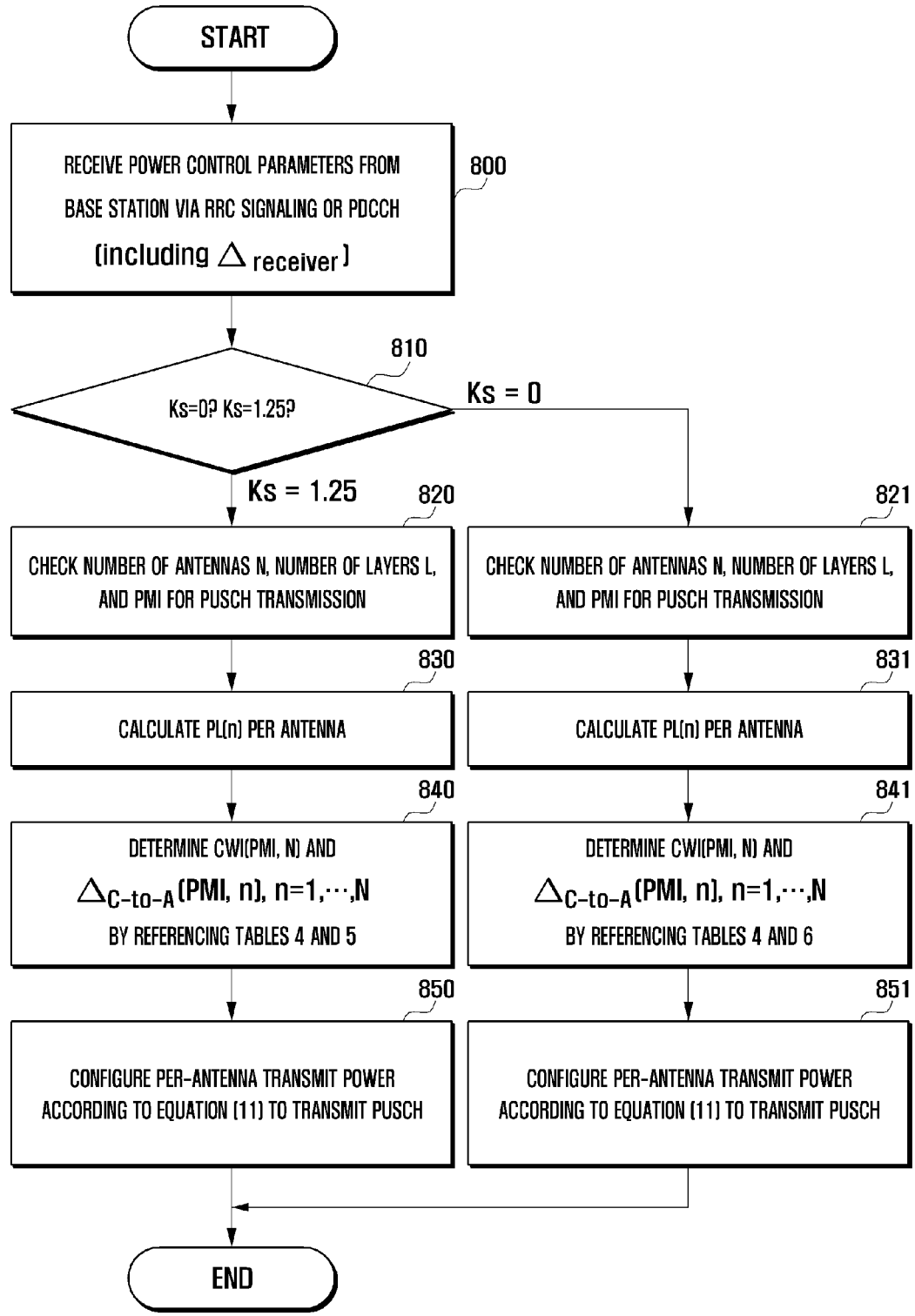
FIG. 8 is a flowchart illustrating the power control method of a UE, according to the fifth embodiment of the present invention.

FIG. 8 is a flowchart illustrating the power control method of a UE, according to the fifth embodiment of the present invention. In this embodiment, the UE 50 controls the transmit power in consideration of the parameters reflecting the characteristics of the base station MIMO transmitter in addition to the parameters provided in the previous embodiments.

Referring to FIG. 8, the UE 50 receives the power control parameters via RRC signaling or PDCCH, in step 800. In this embodiment of the present invention, the per-antenna power control Equation (11) including a parameter reflecting the characteristic of the base station MIMO receiver is used:

$$P_{PUSCH}(i) = \min\left\{P_{CMAX}, \sum_{n=1}^{N} P_{PUSCH, ant}(i, n)\right\} \text{ [dBm]} \quad (11)$$

$$P_{PUSCH\_ant}(i, n) = \min\{P_{CMAX\_ant}(n), P_{PUSCH\_ant\text{-}CALC}(i, n)\} \text{ [dBm]}$$

$$P_{PUSCH\_ant-CALC}(i, n) = 10\log_{10}(M_{PUSCH}(i)) + P_{O\_PUSCH}(j) +$$
$$f(i) + \Delta_{TF}(i, CWI(PMI, n)) + \Delta_{C\text{-}to\text{-}A}(PMI, n) +$$
$$\alpha(j)PL(n) + \Delta_{Receiver}(i, CWI(PMI, n)) \text{ [dBm]}$$

where the parameters except $\Delta_{Receiver}(i,q)$ are identical with the ones as defined in Equation (10). In Equation (11), $\Delta_{Receiver}(i,q)$ is a value reflecting the characteristic of the base station MIMO receiver and can be determined by RRC signaling of the base station or control signal in PDCCH.

The MIMO receiver employing the well-known Successive Interference Cancellation (SIC) scheme is referred to as a SIC receiver. When decoding two codewords, the SIC receiver decodes a predetermined codeword among the two codewords and then decodes the other codeword after canceling interference using the previous decoding result. Since the secondly decoded codeword has the SINR higher than that the first decoded codeword, it can be more efficient to control the transmit power at different levels by giving an offset value to one of the two, rather than controlling the transmit power for the two codewords at the same level. More particularly, when the SIC receiver that cannot adjust the MCS for the two codewords is used, there is a need to adjust the transmit power for the two codewords to different levels. In this embodiment of the present invention, when it is necessary to controls the transmit powers to different levels according to the decision of the base station, $\Delta_{Receiver}(i,q)$ can be configured. For example, if the base station controls the parameter reflecting the characteristic of the base station MIMO receiver with two bits in RRC signaling or PDCCH, it is possible to use one bit to select the codeword for which the offset is configured and the other bit to reflect one of the two predetermined offset values to the power control value $\Delta_{Receiver}(i,q)$ for the selected codeword.

The UE 50 determines whether $K_s$ is 1.25 or 0, in step 810. If $K_s$ is 1.25, the UE 50 checks the number of transmission layers L, the number of transmit antennas N, and the PMI to be used for PUSCH transmission in step 820 and calculates downlink path-loss PL(n) per antenna in step 830. The transmit antennas can be configured with different values or the same value of PL(n). When the antennas are configured with different values of PL(n), the UE 50 can calculate PL to be commonly applied to the transmit antennas. The UE 50 determines CWI(PMI, n) and $\Delta_{C\text{-}to\text{-}A}$(PMI,n) per antenna by referencing Tables 4 and 5, in step 840. Finally, the UE 50 sets the transmit power per antenna according to Equation (11) and transmits PUSCH at the transmit power level, in step 850.

If $K_s$ is 0 at step 810, the UE 50 checks the number of transmission layers L, the number of transmit antennas N, and the PMI necessary for PUSCH transmission, in step 821 and calculates downlink path-loss per antenna PL(n), in step 831. At this time, the transmit antennas can be configured with different values of PN(n) or the same value of PN(n). When the transmit antennas are configured with different values of PL(n), the UE 50 can calculate PL to be commonly applied to the transmit antennas. Next, the UE 50 determines CWI(PMI, n) and $\Delta_{C\text{-}to\text{-}A}$(PMI,n) per layer by referencing tables 4 and 6, in step 841. Finally, the UE 50 sets the transmit power per antenna according to Equation (11) and transmits PUSCH at the transmit power level, in step 851.

Although the fifth embodiment of the present invention is described as an extended case of the fourth embodiment, in which the per-antenna transmit power control is performed according to $K_s$, by adding $\Delta_{Receiver}(i,q)$ as parameter to be further considered, the per-layer power control methods of the first and second embodiments of the present invention can be extended in the similar manner. Also, the method for controlling the transmit power per antenna regardless of $K_s$ according to the third embodiment of the present invention can be extended in the similar manner.

The base station of the LTE-A system according to the fifth embodiment of the present invention follows the power control procedure of FIG. 1, and the parameters necessary for power control are transmitted for use in Equation (11).

Figure 9:
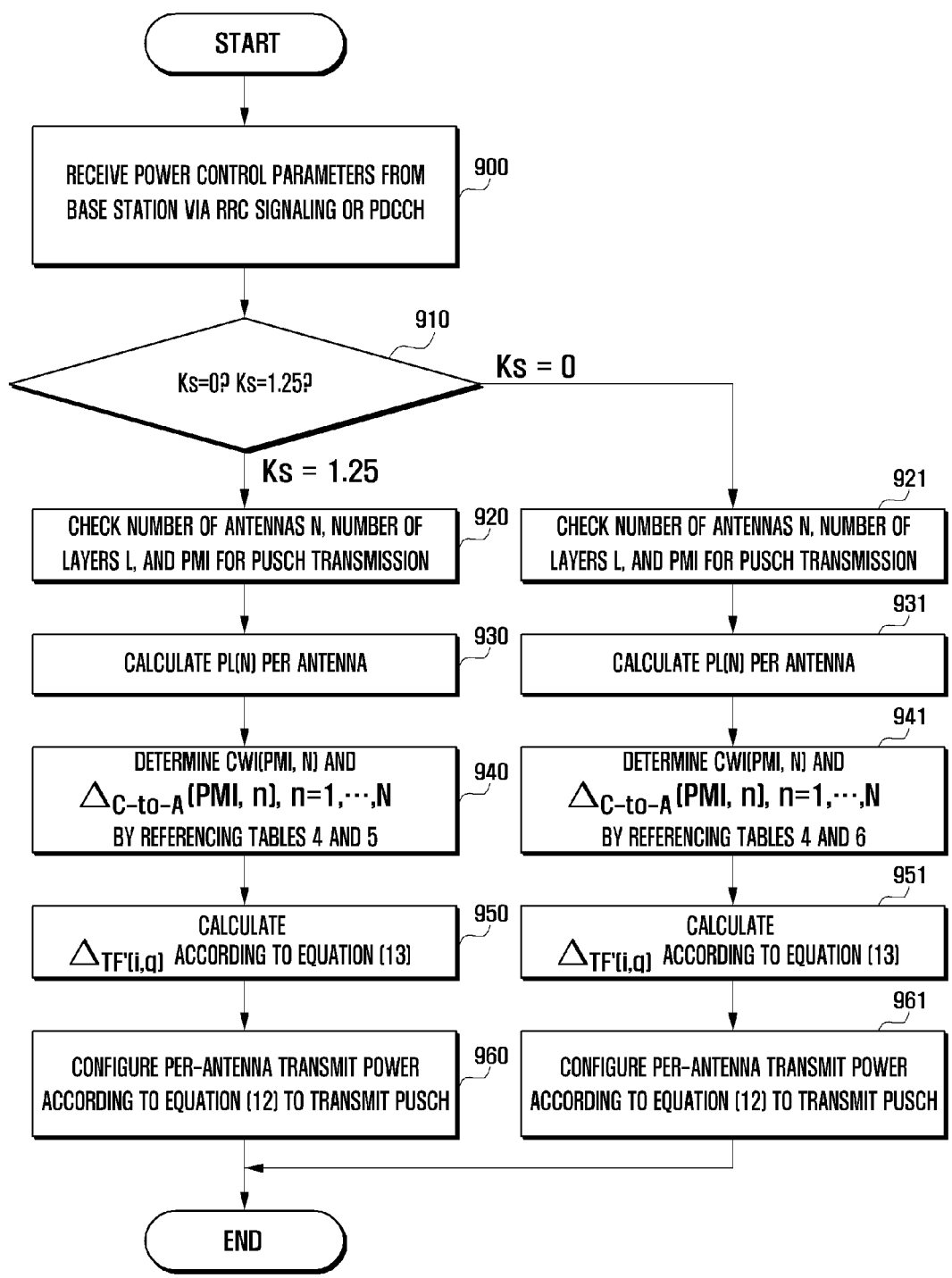
FIG. 9 is a flowchart illustrating the power control method of a UE, according to the sixth embodiment of the present invention.

FIG. 9 is a flowchart illustrating the power control method of a UE, according to the sixth embodiment of the present invention. Unlike the previous embodiment in which the UE configures $\Delta_{TF}(i,q)$ regardless of the number of transmission layer for transmitting one codeword, the UE 50 determines the power control value depending on the number of transmission layers for transmitting one codeword in this sixth embodiment of the present invention.

Referring to FIG. 9, the UE 50 receives the power control parameters via RRC signaling or PDCCH, in step 900. In this embodiment of the present invention, the per-antenna power control Equation (12) includes a parameter reflecting the number of transmission layers to which each codeword is mapped:

$$P_{PUSCH}(i) = \min\left\{P_{CMAX}, \sum_{n=1}^{N} P_{PUSCH,ant}(i, n)\right\} \text{ [dBm]} \quad (12)$$

$$P_{PUSCH\_ant}(i, n) = \min\{P_{CMAX\_ant}(n), P_{PUSCH\_ant\text{-}CALC}(i, n)\} \text{ [dBm]}$$

$$P_{PUSCH\_ant-CALC}(i, n) = 10\log_{10}(M_{PUSCH}(i)) + P_{O\_PUSCH}(j) +$$
$$f(i) + \alpha(j)PL(n) + 10\log_{10}(N_L(i, CWI(PMI, n))) +$$
$$\Delta'_{TF}(i, CWI(PMI, n)) + \Delta_{CtoA}(PMI, n) \text{ [dBm]}$$

where the parameters, except $N_L(i,q)$ and $\Delta'_{TF}(i,q)$, are identical with those defined in Equation (10). In Equation (12), $N_L(i,q)$ denotes a number of transmission layers to be used for $q^{th}$ codeword CW#q, and $\Delta'_{TF}(i,q)$ is defined by Equation (13) unlike $\Delta_{TF}(i,q)$ of Equation (10). $K_s$ can be defined as the indicator for determining the power compensation value according to the spectral efficiency per codeword.

$$\Delta'_{TF}(i, q) = \begin{cases} 10\log_{10}(2^{MPR'(i,q)\cdot K_s} - 1), & K_s = 1.25, \\ 0, & K_s = 0. \end{cases} \quad (13)$$

where MPR'(i,q) is calculated by equation (14):

$$MPR'(i, q) = \frac{TBS(i, q)}{M_{PUSCH}(i) \cdot N_L(q) \cdot N_{sc}^{RB} \cdot (2N_{symb}^{UL})}. \quad (14)$$

In Equation (14), MPR'(i,q) has the nominator different from that of MPR(i,q) in Equation (9), and $M_{PUSCH}(i) \cdot N_L(q) \cdot N_{sc}^{RB} \cdot (2N_{symb}^{UL})$ denotes the multiplication of the number of transmission layers and the number of REs to be used for the transmission of CW#q in a subframe. In this embodiment of the present invention, in which the per-antenna power control is defined by Equation (12), one codeword is transmitted as distributed on two layers. The transmit power value is compensated with $10\log_{10}(N_L(i,CWI(PMI,n)))$ but not $\Delta'_{TF}(i,q)$. Specifically, CWI(PMI, n) denotes the index of the codeword mapped to the nth antenna for the given PMI, and $10\log_{10}(N_L(i,CWI(PMI,n)))$ is the power compensation value for the case where one codeword is transmitted as distributed on multiple transmission layers.

The UE 50 determines whether $K_s$ is 1.25 or 0, in step 810. If $K_s$ is 1.25, the UE 50 checks the number of transmission layers L, the number of transmit antennas N, and the PMI to be used for PUSCH transmission in step 920 and calculates downlink path-loss PL(n) per antenna in step 930. The transmit antennas can be configured with different values or the same value of PL(n). When the antennas are configured with different values of PL(n), the UE 50 can calculate PL to be commonly applied to the transmit antennas. The UE 50 determines CWI(PMI, n) and $\Delta_{C\text{-}to\text{-}A}(PMI,n)$ per antenna by referencing Tables 4 and 5, in step 940. The UE 50 calculates $\Delta'_{TF}(i,q)$ using Equation (13), in step 950. Specifically, as one codeword is distributed on multiple transmission layers, the UE 50 calculates $\Delta'_{TF}(i,q)$ for compensating the per-layer transmit power. Finally, the UE 50 sets the transmit power per antenna according to Equation (12) and transmits PUSCH at the transmit power level, in step 960.

If $K_s$ is 0 at step 910, the UE 50 checks the number of transmission layers L, the number of transmit antennas N, and the PMI necessary for PUSCH transmission in step 921 and calculates downlink path-loss per antenna PL(n) in step 931. The transmit antennas can be configured with different values of PL(n) or the same value of PL(n). When the transmit antennas are configured with different values of PL(n), the UE 50 can calculate PL to be commonly applied to the transmit antennas. The UE 50 determines CWI(PMI, n) and $\Delta_{C\text{-}to\text{-}A}(PMI,n)$ per layer by referencing Tables 4 and 6, in step 941. The UE 50 also calculates $\Delta'_{TF}(i,q)$ using Equation (13), in step 951. Specifically, as one codeword is distributed on multiple transmission layers, the UE 50 calculates $\Delta_{TF}(i,q)$ for compensating the per-layer transmit power. Finally, the UE 50 sets the transmit power per antenna according to Equation (12) and transmits PUSCH at the transmit power level, in step 961.

The base station of the LTE-A system, according to the sixth embodiment of the present invention, follows the power control procedure of FIG. 1, and the parameters necessary for power control are transmitted for use in Equation (12).

Although the sixth embodiment of the present invention is described as an extended case of the fourth embodiment, in which the per-antenna transmit power control is performed according to $K_s$, by adding $\Delta'_{TF}(i,q)$ as parameter to be further considered, the per-layer power control methods of the first and second embodiments of the present invention can be extended in the similar manner. Also, the method for controlling the transmit power per antenna regardless of $K_s$ according to the third embodiment of the present invention and in consideration of the characteristic of the MIMO receiver according to the fifth embodiment of the present invention can be extended in the similar manner.

Figure 10:
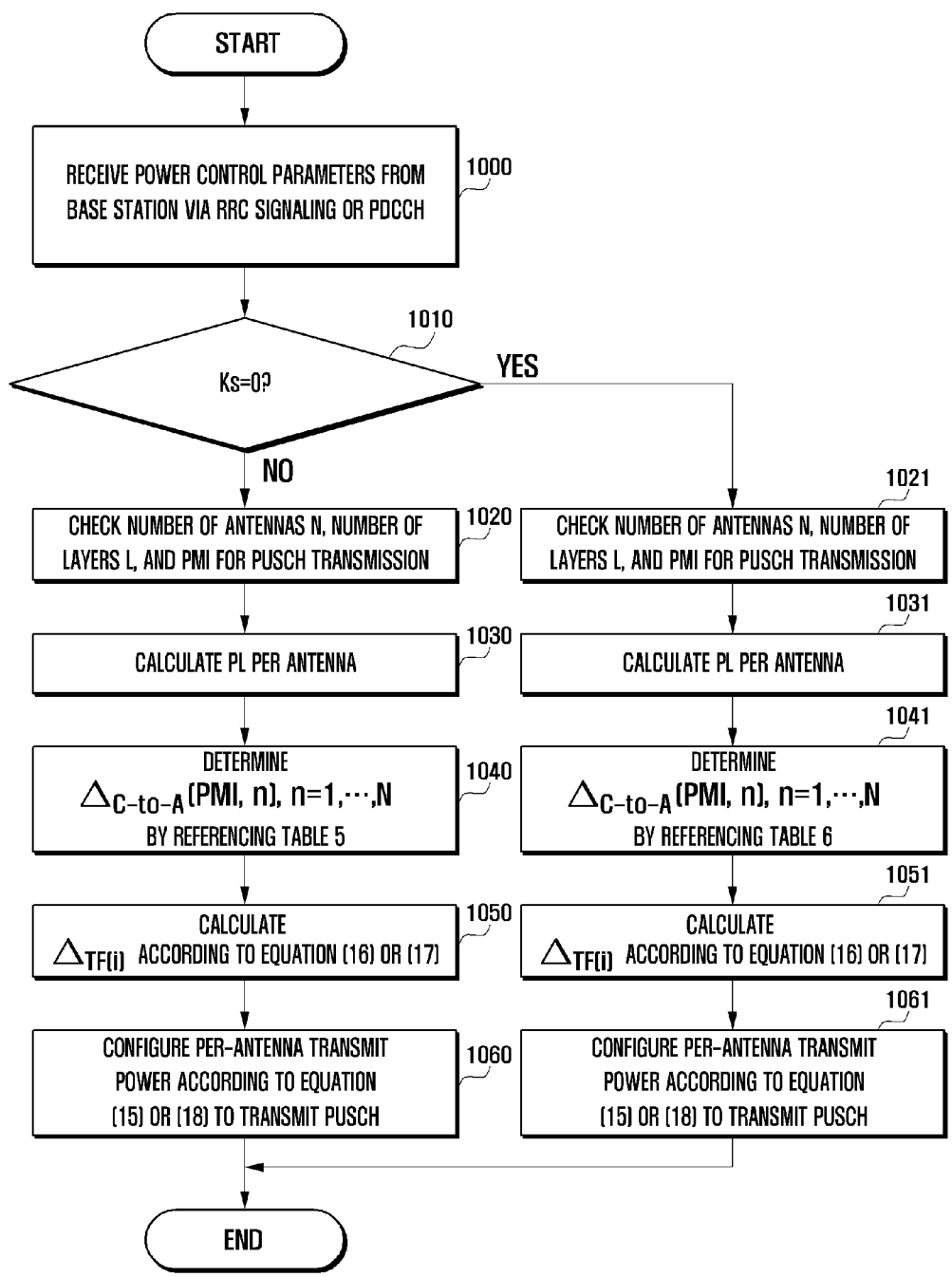
FIG. 10 is a flowchart illustrating the power control method of a UE, according to the seventh embodiment of the present invention.

FIG. 10 is a flowchart illustrating the power control method of a UE, according to the seventh embodiment of the present invention. Unlike the fourth embodiment of the present invention, in which the UE 50 configures $\Delta_{TF}(i,q)$ per codeword with MPR(i,q) for reflecting the spectral efficiency of each codeword as shown in Equations (8) and (9), the power control values are determined such that $\Delta_{TF}(i,q)$ is applied to all of the codewords to be transmitted in this seventh embodiment of the present invention. The power control method proposed in this embodiment allocates the same power to all of the transmit antennas of the UE 50 except when a specific antenna is used, and thus, it is possible to be free from the restriction on the use of different power amplifiers for the respective antennas.

Referring to FIG. 10, the UE receives the power control parameters via RRC signaling or PDCCH, in step 1000. In this embodiment of the present invention, the per-antenna power control Equation (15) is used to configure the same $\Delta_{TF}(i,q)$ for all of the codewords:

$$P_{PUSCH}(i) = \min\left\{P_{CMAX}, \sum_{n=1}^{N} P_{PUSCH,ant}(i, n)\right\} \text{ [dBm]} \quad (15)$$

$$P_{PUSCH\_ant}(i, n) = \min\{P_{CMAX\_ant}(n), P_{PUSCH\_ant\text{-}CALC}(i, n)\} \text{ [dBm]}$$

$$P_{PUSCH\_ant-CALC}(i, n) = 10\log_{10}(M_{PUSCH}(i)) + P_{0\_PUSCH}(j) +$$
$$f(i) + \alpha(j)PL + \Delta_{TF}(i) + \Delta_{CtoA}(PMI, n) \text{ [dBm]}$$

where the parameters, except PL and $\Delta_{TF}(i)$, are identical with the ones as defined in Equation (10). PL denotes downlink path-loss and is set to the same value for all of the antennas. Also, $\Delta_{TF}(i)$ is set to the same value for all of the antennas so as to be commonly applied to all of the codewords. In order to apply $\Delta_{TF}(i)$ to all of the codewords commonly, it is required to commonly define MPR(i), which is a value reflecting the number of information bits per RE in a subframe, and MPR(i) can be defined as one of sum, average, maximum value, and minimum value of the MPR(i,q) of individual codewords.

When MPR(i,q) is defined as the average, maximum value, or minimum value of MPR(i,q), $\Delta_{TF}(i)$ is defined by Equation (16). This is the method for allocating the power for the individual codewords at the same level after determining a common power compensation value in consideration of the average, maximum value, or minimum value of spectral efficiency of all the codewords. Here, $K_S$ can be defined as an indicator for determining the power compensation value according to the spectral efficiency of each codeword and, if not 0, can be determined as a specific value for reflecting the characteristics of the multiple antenna system. Particularly, $K_S$ can be set to different values for the transmissions of multiple codewords and single codeword. Specifically, in LTE-A, $K_S$ can is set to 1.25 for the transmission of a single codeword as in LTE and a value, except 1.25, for the transmission of two codewords. Also, it can be considered to set $K_S$ to different values for the cases of using multiple antenna ports and one antenna port.

$$\Delta_{TF}(i) = \begin{cases} 10\log_{10}(2^{MPR(i) \cdot K_s} - 1), & K_s \neq 0, \\ 0, & K_s = 0. \end{cases} \quad (16)$$

When MPR(i) is configured as the sum of MPR(i,q), $\Delta_{TF}(i)$ is defined by Equation (17). This is the method for allocating power, as equally divided, to the codewords after determining the common power compensation value in consideration of the sum of spectral efficiencies of the codewords.

$$\Delta_{TF}(i) = \begin{cases} 10\log_{10}\left[\frac{1}{Q}(2^{MPR(i) \cdot K_s} - 1)\right], & K_s \neq 0, \\ 0, & K_s = 0. \end{cases} \quad (17)$$

In Equation (17), Q denotes a number of codewords to be transmitted in uplink. When the power is configured by Equation (15), the same power is allocated to the antennas of the UE 500, except when a precoder which does not use a specific antenna is selected, and thus it is possible to be free from the restriction on the use of different power amplifiers for the respective antennas.

In case of performing power control per antenna using $\Delta_{TF}(i)$ of Equation (17) and the power control Equation (15), the power allocated for each codeword can be expressed by Equation (18):

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\}P_{PUSCH per CW}(i) = P_{PUSCH}(i)/Q \quad (18)$$

In Equation (18), $\Delta_{TF}(i)$ is defined by Equation (17), and MPR(i) is defined by Equation (19):

$$MPR(i) = \sum_{q=0}^{Q-1} MPR(i, q) \quad (19)$$

In Equation (19), MPR(i,q) is defined by Equation (9) and reflects spectral efficiency per codeword.

The UE 50 determines whether $K_s$ is 0, in step 1010. If $K_s$ is not 0, the UE 50 checks the number of transmission layers L, the number of transmit antennas N, and the PMI to be used for PUSCH transmission in step 1020 and calculates a common downlink path-loss PL for the antennas in step 1030. The UE 50 determines $\Delta_{C\text{-}to\text{-}A}(PMI,n)$ per antenna by referencing Table 5, in step 1040. The UE 50 also calculates $\Delta_{TF}(i)$ by referencing Equation (16) or (17), in step 1050. Specifically, the UE 50 calculates $\Delta_{TF}(i)$ to be commonly used for compensating the transmit power for all of the codewords. Finally, the UE 50 sets the transmit power per antenna according to Equation (15) and transmits PUSCH at the transmit power level, in step 1060.

If $K_s$ is 0 at step 1010, the UE checks the number of transmission layers L, the number of transmit antennas N, and the PMI to be used for PUSCH transmission in step 1021 and calculates a common downlink path-loss PL for the antennas in step 1031. The UE 50 determines $\Delta_{C\text{-}to\text{-}A}(PMI,n)$ per antenna by referencing Table 6, in step 1041. The UE 50 also calculates $\Delta_{TF}(i)$ by referencing Equation (16) or (17), in step 1051. Specifically, the UE 50 calculates $\Delta_{TF}(i)$ to be commonly used for compensating the transmit power for all of the codewords. Finally, the UE 50 sets the transmit power per antenna according to Equation (15) or (18) and transmits PUSCH at the transmit power level, in step 1061.

The base station of the LTE-A system, according to the seventh embodiment of the present invention, follows the power control procedure of FIG. 1, and the parameters necessary for the power control are transmitted for use in Equation (15) or (18).

While the invention has been shown and described with reference to certain embodiments thereof, it will be understood by those skilled in the art that various changes in form and detail may be made therein without departing from the spirit and scope of the invention as defined in the appended claims and their equivalents.

What is claimed is:

1. An uplink power control method of a terminal in a mobile communication system, comprising the steps of:
   identifying a number of layers for uplink data transmission;
   calculating a transmit power for a plurality of transmit antennas based on a power control parameter received in a downlink, the number of layers for uplink data transmission, and a characteristic of a plurality of codewords or of a receiver that processes the plurality of codewords; and
   transmitting uplink data through the plurality of transmit antennas by applying the transmit power to each of the plurality of codewords.

2. The uplink power control method of claim 1, wherein calculating the transmit power comprises:
   computing a sum of data sizes corresponding to the plurality of codewords;
   computing a total transmit power corresponding to the sum of data sizes; and
   computing the transmit power by dividing the total transmit power into a number of the plurality of codewords.

3. The uplink power control method of claim 1, wherein calculating the transmit power comprises computing the transmit power according to spectral efficiencies of the plurality of codewords, wherein the spectral efficiencies are determined differently according to a number of the plurality of codewords.

4. The uplink power control method of claim 1, wherein calculating the transmit power comprises:

checking the characteristic of the receiver that processes the plurality of codewords to acquire the plurality of codewords from the power control parameter; and computing the transmit power according to the characteristic of the receiver.

5. An uplink power control apparatus of a terminal in a mobile communication system, comprising:
- a plurality of transmit antennas for transmitting uplink data;
- a power controller that receives a power control parameter in a downlink, identifies a number of layers for uplink data transmission, and calculates a transmit power for the plurality of transmit antennas according to the power control parameter, the number of layers for uplink data transmission, and a characteristic of a plurality of codewords or of a receiver that processes the plurality of codewords; and
- a plurality of power amplifiers for applying the transmit power to each of the plurality of codewords to transmit the uplink data through the plurality of transmit antennas.

6. The uplink power control apparatus of claim 5, wherein the power controller computes a sum of data sizes corresponding to the plurality of codewords, computes a total transmit power corresponding to the sum of data sizes, and computes the transmit power by dividing the total transmit power into a number of the plurality of codewords.

7. The uplink power control apparatus of claim 5, wherein the power controller computes the transmit power according to spectral efficiencies of the plurality of codewords, and the spectral efficiencies are determined differently according to a number of the plurality of codewords.

8. The uplink power control apparatus of claim 5, wherein the power controller checks the characteristic of the receiver that processes the plurality of codewords to acquire the plurality of codewords from the power control parameter and computes the transmit power according to the characteristic of the receiver.

9. An uplink power control method of a base station in a mobile communication system, comprising the steps of:
- transmitting a power control parameter configured for a terminal having a plurality of transmit antennas; and
- receiving uplink data transmitted by the terminal through the plurality of transmit antennas by applying a transmit power calculated according to the power control parameter, a number of layers for uplink data transmission identified by the terminal, and a characteristic of a plurality of codewords or of a receiver that processes the plurality of codewords, to each of the plurality of codewords.

10. The uplink power control method of claim 9, wherein the terminal computes a sum of data sizes corresponding to the plurality of codewords, a total transmit power corresponding to the sum of data sizes, and the transmit power by dividing the total transmit power into a number of the plurality of codewords.

11. The uplink power control method of claim 9, wherein the terminal computes the transmit power according to spectral efficiencies of the plurality of codewords, and the spectral efficiencies are determined differently according to a number of the plurality of codewords.

12. The uplink power control method of claim 9, wherein the terminal checks the characteristic of the receiver which processes the plurality of codewords to acquire the plurality of codewords from the power control parameter and computes the transmit power according to the characteristic of the receiver.

13. An uplink power control apparatus of a base station in a mobile communication system, comprising:
- a configuration unit that configures a power control parameter for a terminal having a plurality of transmit antennas;
- a transmitter that transmits the power control parameter in a downlink; and
- a receiver that receives uplink data transmitted by the terminal through the plurality of transmit antennas by applying a transmit power calculated according to the power control parameter, a number of layers for uplink data transmission identified by the terminal, and a characteristic of a plurality of codewords or of a receiver that processes the plurality of codewords, to each of the plurality of codewords.

14. The uplink power control apparatus of claim 13, wherein the terminal computes a sum of data sizes corresponding to the plurality of codewords, a total transmit power corresponding to the sum of data sizes, and the transmit power by dividing the total transmit power into a number of the plurality of codewords.

15. The uplink power control apparatus of claim 13, wherein the terminal computes the transmit power according to spectral efficiencies of the plurality of codewords, and the spectral efficiencies are determined differently according to a number of the plurality of codewords.

16. The uplink power control apparatus of claim 13, wherein the terminal checks the characteristic of the receiver which processes the plurality of codewords to acquire the plurality of codewords from the power control parameter, and computes the transmit power according to the characteristic of the receiver.

* * * * *